US010366650B2

(12) United States Patent
Ahn

(10) Patent No.: US 10,366,650 B2
(45) Date of Patent: Jul. 30, 2019

(54) DISPLAY APPARATUS, CHASSIS THEREOF, AND A MANUFACTURING METHOD THEREOF

(71) Applicant: SAMSUNG ELECTRONICS CO., LTD., Suwon-si (KR)

(72) Inventor: Joon Seok Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 141 days.

(21) Appl. No.: 14/635,572

(22) Filed: Mar. 2, 2015

(65) Prior Publication Data

US 2015/0248858 A1 Sep. 3, 2015

Related U.S. Application Data

(60) Provisional application No. 61/946,190, filed on Feb. 28, 2014, provisional application No. 61/946,166, filed on Feb. 28, 2014.

(30) Foreign Application Priority Data

Jul. 16, 2014 (KR) .................. 10-2014-0089691

(51) Int. Cl.
*H04N 5/64* (2006.01)
*G09G 3/32* (2016.01)
(Continued)

(52) U.S. Cl.
CPC .......... *G09G 3/32* (2013.01); *G02F 1/133308* (2013.01); *G06F 1/1601* (2013.01);
(Continued)

(58) Field of Classification Search
CPC ... G09G 3/32; G06F 1/1601; G02F 1/133308; G02F 2001/133325; G02F 2001/133314; G02F 2001/133328; Y10T 29/49826
See application file for complete search history.

(56) References Cited

U.S. PATENT DOCUMENTS 9,389,359 B2 * 7/2016 Hsiao ............... G02F 1/133308
2008/0106667 A1 * 5/2008 Fukuda ............ G02F 1/133308
349/58

(Continued)

FOREIGN PATENT DOCUMENTS

CN 101320182 A 12/2008
CN 101681058 A 3/2010
(Continued)

OTHER PUBLICATIONS

Communication dated Jun. 12, 2015, issued by the European Patent Office in counterpart European Patent Application No. 15156789.8.
(Continued)

*Primary Examiner* — Nicholas J Lee
*Assistant Examiner* — Gerald L Oliver
(74) *Attorney, Agent, or Firm* — Sughrue Mion, PLLC

(57) ABSTRACT

A display apparatus including: a display panel configured to display an image; and a rear chassis arranged at a rear side of the display panel, the rear chassis comprising a back plate forming a back surface of the rear chassis, an upper frame coupled to an upper end of the back plate, and a lower frame coupled to a lower end of the back plate, wherein the rear chassis is curved so that lateral sides thereof protrude forward.

24 Claims, 10 Drawing Sheets

(51) Int. Cl.
*G02F 1/1333* (2006.01)
*G06F 1/16* (2006.01)

(52) U.S. Cl.
CPC ............ *G02F 2001/133314* (2013.01); *G02F 2001/133325* (2013.01); *G02F 2001/133328* (2013.01); *H04N 5/64* (2013.01); *Y10T 29/49826* (2015.01)

(56) References Cited

U.S. PATENT DOCUMENTS

| | | | | |
|---|---|---|---|---|
| 2009/0091681 | A1* | 4/2009 | Nishizawa | G02F 1/133308 349/58 |
| 2009/0303413 | A1* | 12/2009 | Ohta | G02B 5/045 349/62 |
| 2010/0073620 | A1* | 3/2010 | Yamaguchi | G02F 1/133305 349/160 |
| 2010/0149833 | A1 | 6/2010 | Kuromizu | |
| 2012/0281367 | A1* | 11/2012 | He | H05K 5/02 361/728 |
| 2013/0155655 | A1* | 6/2013 | Lee | H05K 5/03 362/97.1 |
| 2013/0321740 | A1 | 12/2013 | An et al. | |
| 2014/0009914 | A1 | 1/2014 | Cho et al. | |
| 2014/0125913 | A1* | 5/2014 | Lee | G02B 6/0093 349/58 |
| 2014/0240906 | A1* | 8/2014 | Seo | A47B 81/06 361/679.01 |
| 2015/0153780 | A1* | 6/2015 | Maatta | G06F 1/1656 361/679.27 |
| 2015/0260908 | A1* | 9/2015 | Kiguchi | G02B 6/0051 349/58 |
| 2015/0346538 | A1* | 12/2015 | Hsiao | G02F 1/133308 349/58 |

FOREIGN PATENT DOCUMENTS

| | | |
|---|---|---|
| CN | 103424898 A | 12/2013 |
| CN | 103424913 A | 12/2013 |
| JP | 2008-304535 A | 12/2008 |
| KR | 10-1326299 B1 | 11/2013 |
| KR | 10-2013-0132232 A | 12/2013 |
| WO | 2013172538 A1 | 11/2013 |

OTHER PUBLICATIONS

Communication dated Jun. 19, 2015, issued by the International Searching Authority in counterpart International Patent Application No. PCT/KR2015/001945 (PCT/ISA/210).
Communication dated Jul. 4, 2018, issued by the State Intellectual Property Office of P.R. China in counterpart Chinese Application No. 201510091340.4.
Communication dated Sep. 4, 2018, issued by the European Patent Office in counterpart European Application No. 15156789.8.
Communication dated Feb. 27, 2019, issued by the European Patent Office in counterpart European Patent Application No. 15156789.8.
Communication dated Jan. 24, 2019, issued by the Indian Patent Office in counterpart Indian Application No. 201617032813.
Communication dated Mar. 27, 2019, issued by the Patent Office of the People's Republic of China in counterpart Chinese Application No. 201510091340.4.

* cited by examiner

DISPLAY APPARATUS, CHASSIS THEREOF, AND A MANUFACTURING METHOD THEREOF

CROSS-REFERENCE TO RELATED APPLICATION(S)

This application claims the benefit of Korean Patent Application No. 10-2014-0089691, filed on Jul. 16, 2014 in the Korean Intellectual Property Office, the disclosure of which is incorporated herein by reference in its entirety.

This application also claims the benefit of U.S. Provisional Application Nos. 61/946,190, filed on Feb. 28, 2014 and 61/946,166, filed on Feb. 28, 2014, the contents of which are hereby incorporated by reference in their entireties.

BACKGROUND

1. Field

One or more exemplary embodiments relate to a display apparatus having a curved display equipped with both lateral ends protruding forward, a chassis thereof, and a manufacturing method thereof.

2. Description of the Related Art

Generally, a display apparatus includes a display module, i.e., a display, that displays images. Examples of display apparatuses include televisions or monitors.

A display apparatus having a display formed in a curved shape with lateral ends thereof protruding forward has been proposed.

The display may include optical sheets, a diffusion plate, and a backlight unit enclosed with front and rear chassis.

However, when the display is curved, the optical sheets may be wrinkled, and the quality of the display may be reduced.

Further, in order to accommodate the various components of the display, at least one of the front and rear chassis must have a certain thickness. However, it is difficult to manufacture a chassis having a curved shape with the certain thickness in a single process. Accordingly, what is needed is a more easily manufactured curved chassis.

SUMMARY

Therefore, an aspect of one or more exemplary embodiments is to provide a display apparatus with a more easily manufacture a curved rear chassis.

Additional aspects of one or more exemplary embodiments will be set forth in part in the description which follows and, in part, will be obvious from the description, or may be learned by practice of one or more exemplary embodiments.

In accordance with an aspect of one or more exemplary embodiments, a display apparatus includes: a display panel configured to display an image; and a rear chassis arranged at a rear side of the display panel, the rear chassis including a back plate forming a back surface of the rear chassis, an upper frame coupled to an upper end of the back plate, and a lower frame coupled to a lower end of the back plate, wherein the rear chassis is curved so that lateral sides thereof protrude forward.

The back plate may be coupled to the upper frame and the lower frame, at least one of the back plate, the upper frame, and the lower frame are modified to have a curved shape.

The upper frame and the lower frame are curved so that lateral sides thereof protrude forward, and when the back plate is coupled to the upper frame and the lower frame, the back plate may be curved to correspond to the curve of the upper frame and the lower frame.

The back plate is curved so that lateral sides thereof protrude forward, and when the upper frame and the lower frame are coupled to the back plate, the upper frame and the lower frame may be curved to correspond to the curve of the back plate.

The back plate, the upper frame, and the lower frame may be connected through fastening members. Each of the back plate, the upper frame, and the lower frame may include fastening holes through which the fastening members pass. The fastening holes provided in the upper frame and the lower frame may be spaced apart from each other at predetermined distances, and the fastening holes provided in the back plate may be spaced apart corresponding to the spacing between the fastening holes provided in the upper frame and the lower frame.

The back plate may be curved so that lateral sides thereof protrude forward, and the upper frame and the lower frame may be curved corresponding to the curvature of the back plate.

The rear chassis may further include two lateral frames coupled to respective lateral ends of the back plate.

The two lateral frames, the upper frame, and the lower frame may be formed as a continuous frame.

The display apparatus may further include: a backlight unit arranged in the rear chassis configured to provide light to the display panel, the backlight unit comprising a board arranged in front of the back plate and a plurality of light emitting diodes (LEDs) arranged on the board.

The display apparatus may further include: a diffusion plate arranged behind a rear side of the display panel; at least one optical sheet arranged on a front surface of the diffusion plate between the display panel and the diffusion plate; and a middle mold configured to support the display panel and an outer wall of the diffusion plate in such a manner that the display panel and the outer wall of the diffusion plate are spaced apart from each other by a predetermined distance. The middle mold may include at least one diffusion plate support unit that is in direct contact with the front surface of the diffusion plate so as to directly support the diffusion plate.

The at least one diffusion plate support unit may include a plurality of diffusion plate support units spaced apart from each other along the outer wall of the diffusion plate.

The at least one diffusion plate support unit may be extended along an entirety of the outer wall of the diffusion plate.

The display apparatus may further include: a source printed circuit board (PCB) coupled to the display panel through a flexible PCB. At least one of the upper frame and the lower frame may include a board support unit extending in a vertical direction configured to support the source PCB In accordance with an aspect of one or more exemplary embodiments, a display apparatus includes: a display formed in a curved shape so that both lateral sides thereof protrude forward. The display may include a display panel, a diffusion plate arranged behind the display panel, a middle mold configured to support the display panel and the diffusion plate, and at least one optical sheet arranged on a front surface of the diffusion plate. The middle mold may include at least one diffusion plate support unit directly supporting an outer wall of a front surface of the diffusion plate.

The at least one diffusion plate support unit may be extended along an entirety of the outer wall of the front surface of the display panel.

The at least one diffusion plate support unit may include a plurality of diffusion plate support units spaced apart from each other along the outer wall of the front surface of the diffusion plate.

In accordance with an aspect of one or more exemplary embodiments, a chassis includes: a back plate forming a back surface of the chassis; an upper frame coupled to an upper end of the back plate; and a lower frame coupled to a lower end of the back plate. The chassis is curved so that lateral ends of the back plate, the lower frame, and the upper frame protrude forward.

The upper frame and the lower frame are curved so that lateral sides thereof protrude forward. When the back plate is coupled to the upper frame and the lower frame, the back plate is curved corresponding to the curvature of the upper frame and the lower frame.

The back plate is curved so that lateral sides thereof protrude forward. When the upper frame and the lower frame are coupled to the back plate, the upper frame and the lower frame are curved corresponding to the curvature of the back plate.

The back plate may be curved so that lateral sides thereof protrude forward, and the upper frame and the lower frame may be curved corresponding to the curvature of the back plate.

The chassis may further include two lateral frames coupled to respective lateral ends of the back plate.

The upper frame may include a plurality of slits configured to provide flexibility to the upper frame, and the lower frame may include a plurality of slits configured to provide flexibility to the lower frame.

The back plate may include a honeycomb structure disposed between two plates.

In accordance with an aspect of one or more exemplary embodiments, a method of manufacturing a chassis includes: affixing a lower frame to a lower end of a back plate forming a back surface of the chassis; and affixing an upper frame to an upper end of the back plate. The chassis is curved so that lateral ends of the back plate, the lower frame, and the upper frame protrude forward.

The back plate may have a curved shape, and the affixing the lower frame and the affixing the upper frame may curve at least one of the lower frame and the upper frame corresponding to the curvature of the back plate.

The lower frame and the upper frame may be curved shape, and the affixing the lower frame and the affixing the upper frame may curve the back plate corresponding to the curvature of the lower frame and the upper frame.

BRIEF DESCRIPTION OF THE DRAWINGS

These and/or other aspects of the one or more exemplary embodiments will become apparent and more readily appreciated from the following description taken in conjunction with the accompanying drawings.

DETAILED DESCRIPTION

Figure 1:
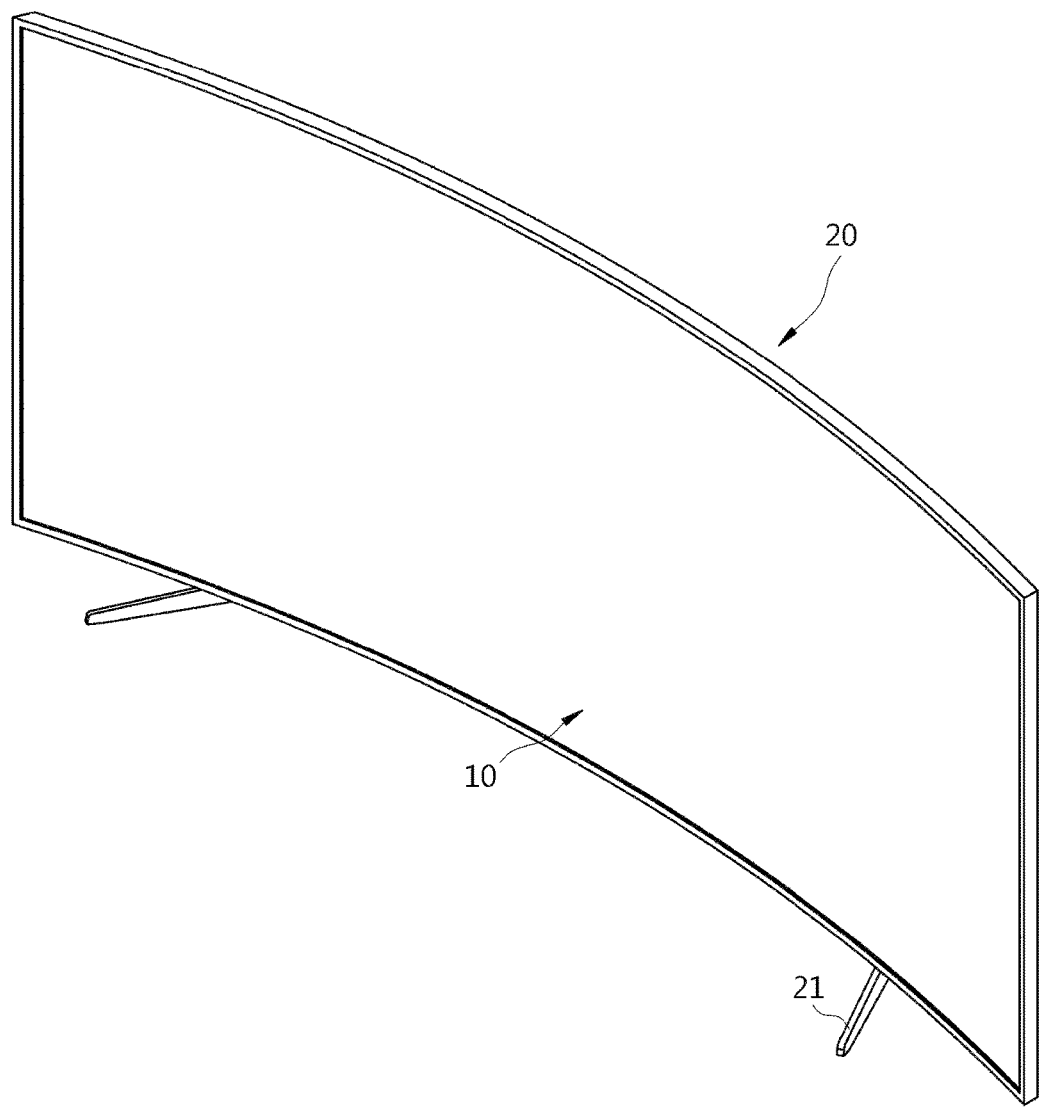
FIG. 1 is a perspective view of a display apparatus according to an exemplary embodiment.

Reference will now be made in detail to one or more exemplary embodiments, examples of which are illustrated in the accompanying drawings, wherein like reference numerals refer to like elements throughout.

Referring to FIG. 1, the display apparatus 1 may include a display 10, i.e., a display module, for displaying images and a case 20 for accommodating various electronic components.

The display 10 is curved such that lateral ends thereof protrude forward on the basis of the central portion.

The case 20 is formed to cover not only top, bottom, left, and right sides of the display 10, but also a rear side of the display 10. The case 20 is curved to correspond to the curve of the display 10. The case 20 may include a stand 21 for allowing the display apparatus 1 to stand upright.

A power-supply board for powering the display apparatus 1, a signal processing board for processing various images and sound signals, a panel drive board for controlling a display panel 11 to be described later, and a timing control board for supplying image signals to the display panel 11 are disposed between the display 10 and the case 20.

Figure 2:
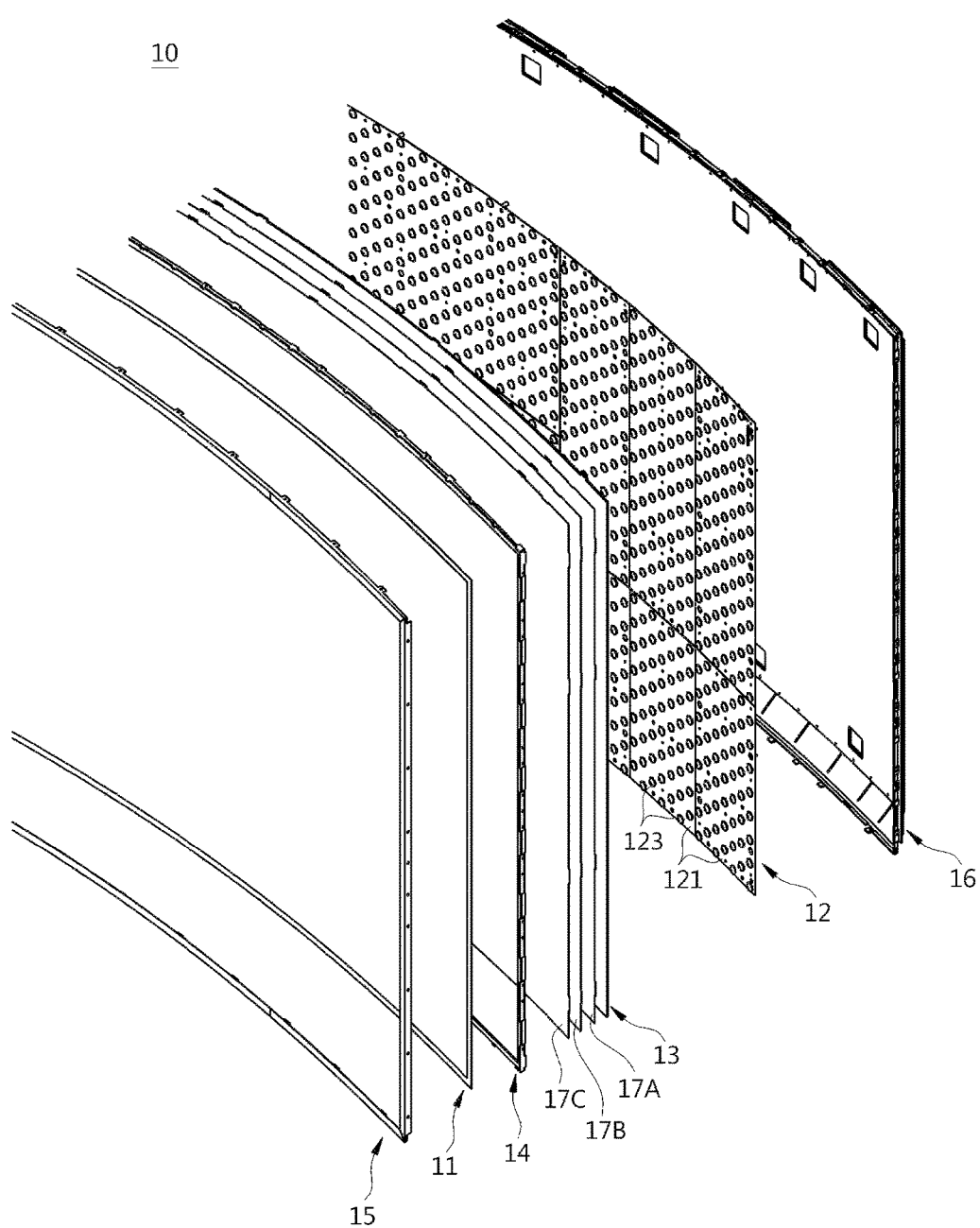
FIG. 2 is an exploded perspective view of a display of a display apparatus according to an exemplary embodiment.
Figure 3:
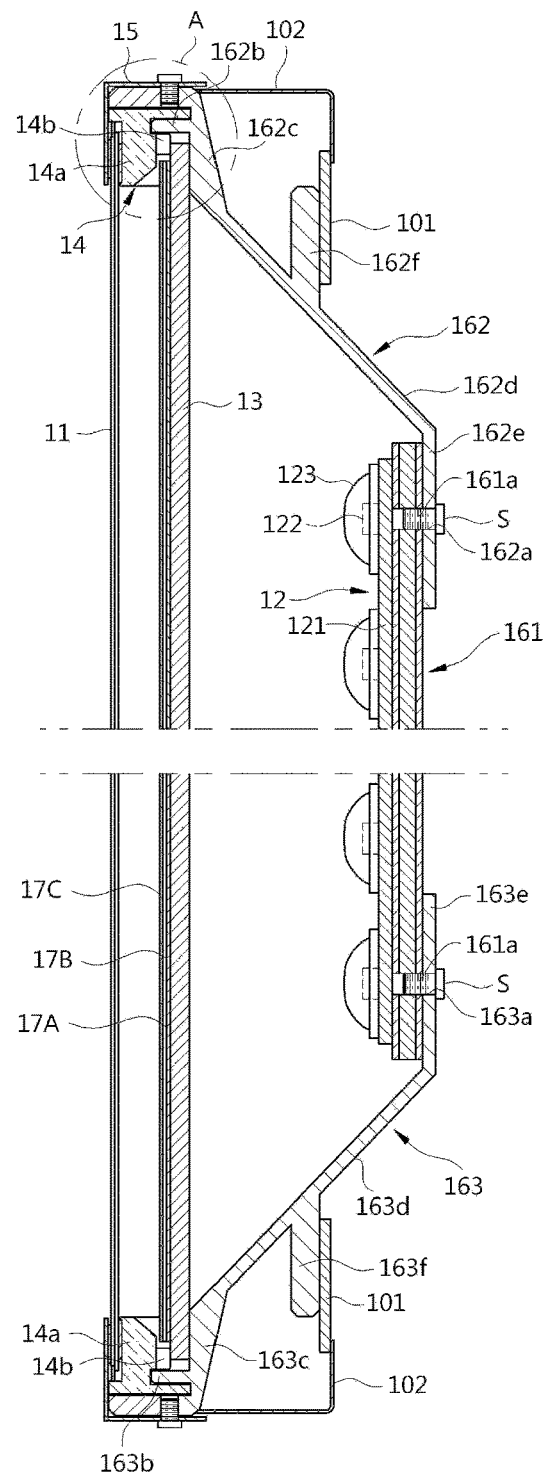
FIG. 3 is a cross-sectional view of a display of a display apparatus according to an exemplary embodiment.

Referring to FIGS. 2 and 3, the display 10 includes a display panel 11 for displaying a screen image; a backlight unit 12, i.e., a backlight, disposed behind of the display panel 11 to provide light to the display panel 11; a diffusion plate 13 disposed between the backlight unit 12 and the display panel 11; a middle mold 14 to support the display panel 11 and the diffusion plate 13; a front chassis 15 coupled to a front side of the middle mold 14 to maintain a connection state between the display panel 11 and the middle mold 14; and a rear chassis 16 coupled to a rear side of the middle mold 14 and configured to accommodate the backlight unit 12, the rear chassis 16 being arranged at the rear of the display panel 11.

The display panel 11 is formed in a rectangular flat panel, and a source printed circuit board (PCB) 101 is coupled to an upper end and a lower end of the display panel 11 through a flexible PCB 102. The scope or spirit of the present invention is not limited thereto, and the flexible PCB 102 may also be coupled to either one of the upper end and the lower end of the display panel 11 as necessary.

The backlight unit 12 may include a board 121 shaped as a rectangular flat panel; a plurality of light emitting diodes (LEDs 122) installed on the board 121, to emit light; and a plurality of lenses 123 installed on the LEDs 122, to focus light generated by the LEDs 122. In accordance with one or more exemplary embodiments, the backlight unit 12 may include a plurality of boards 121 classified into vertical boards arranged in parallel in a vertical direction and horizontal boards arranged in parallel in a horizontal direction. A plurality of LEDs 122 and a plurality of lenses 123 are installed on the plurality of boards 121. A shape of the plurality of boards 121 may correspond to a shape of the display panel 11, but the display panel 11 may have a larger size than the plurality of boards 121.

The diffusion plate 13 is formed in a rectangular flat panel corresponding to the display panel 11, and is formed of a transparent material so as to diffuse light that passes through the diffusion plate 13. According to one or more exemplary embodiment, diffusion plate 13 is disposed between the middle mold 14 and the rear chassis 16.

A plurality of optical sheets (17A, 17B, 17C) is arranged on a front surface of the diffusion plate 13 so as to improve optical characteristics of the light. The optical sheets (17A, 17B, 17C) may include a diffusion sheet 17A, a prism sheet 17B, and a protective sheet 17C. The diffusion sheet 17A further diffuses light that passed through the diffusion plate 13. The prism sheet 17B is located on a front side of the diffusion sheet 17A, and includes a prism-shaped pattern to allow light diffused by the diffusion sheet 17A to be concentrated in a direction perpendicular to the display panel 11. The protective sheet 17C is disposed on a front side of the prism sheet 17B to protect the prism sheet 17B.

The optical sheets (17A, 17B, 17C) may be formed of a resin film that can be easily modified. Therefore, the shape of the optical sheets (17A, 17B, 17C) may be modified to correspond to a shape of the diffusion plate 13. In addition, each of the optical sheets (17A, 17B, 17C) is formed to have a shorter length and width than the diffusion plate 13, so that an outer wall of the front surface of the diffusion plate 13 is not covered by the optical sheets (17A, 17B, 17C).

Figure 5:
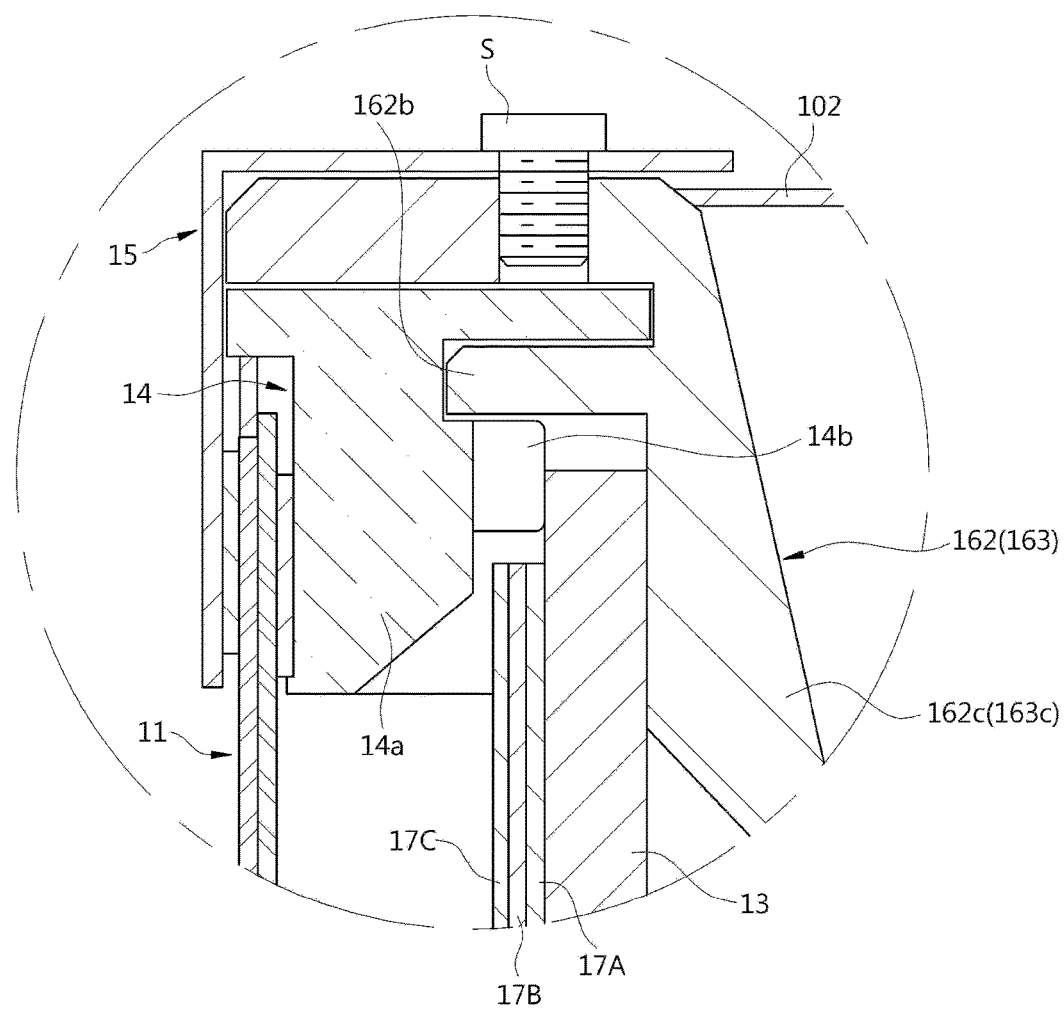
FIG. 5 is an enlarged view of portion A of FIG. 3.

The middle mold 14 is formed in a rectangular ring shape to support the outer wall of the display panel 11. The middle mold 14 includes a panel seating unit 14a, i.e., a panel support portion, in which the display panel 11 is seated and supported, and a diffusion plate support unit 14b, i.e., a diffusion plate support portion, extended from a back portion of the panel seating unit 14a so as to support the diffusion plate 13. As can be seen from FIG. 5, several diffusion plate support units 14b may be spaced apart from each other corresponding to the outer wall of the diffusion plate 13.

The diffusion plate support unit 14b may directly support the outer wall of the front surface of the diffusion plate 13 that is not covered by the optical sheets (17A, 17B, 17C). Therefore, the diffusion plate support unit 14b will not wrinkle the optical sheets (17A, 17B, 17C) when the diffusion plate 13 is curved. That is, if the diffusion plate support unit 14b supports the diffusion plate 13 through the optical sheets (17A, 17B, 17C), when the diffusion plate 13 is curved wrinkles may form in the optical sheets (17A, 17B, 17C). However, if the diffusion plate support unit 14b directly supports the diffusion plate 13, it does not apply force to the optical sheets (17A, 17B, 17C), and the shape of the optical sheets (17A, 17B, 17C) is modified to correspond to the shape of the diffusion plate 13 without wrinkling.

Figure 6:
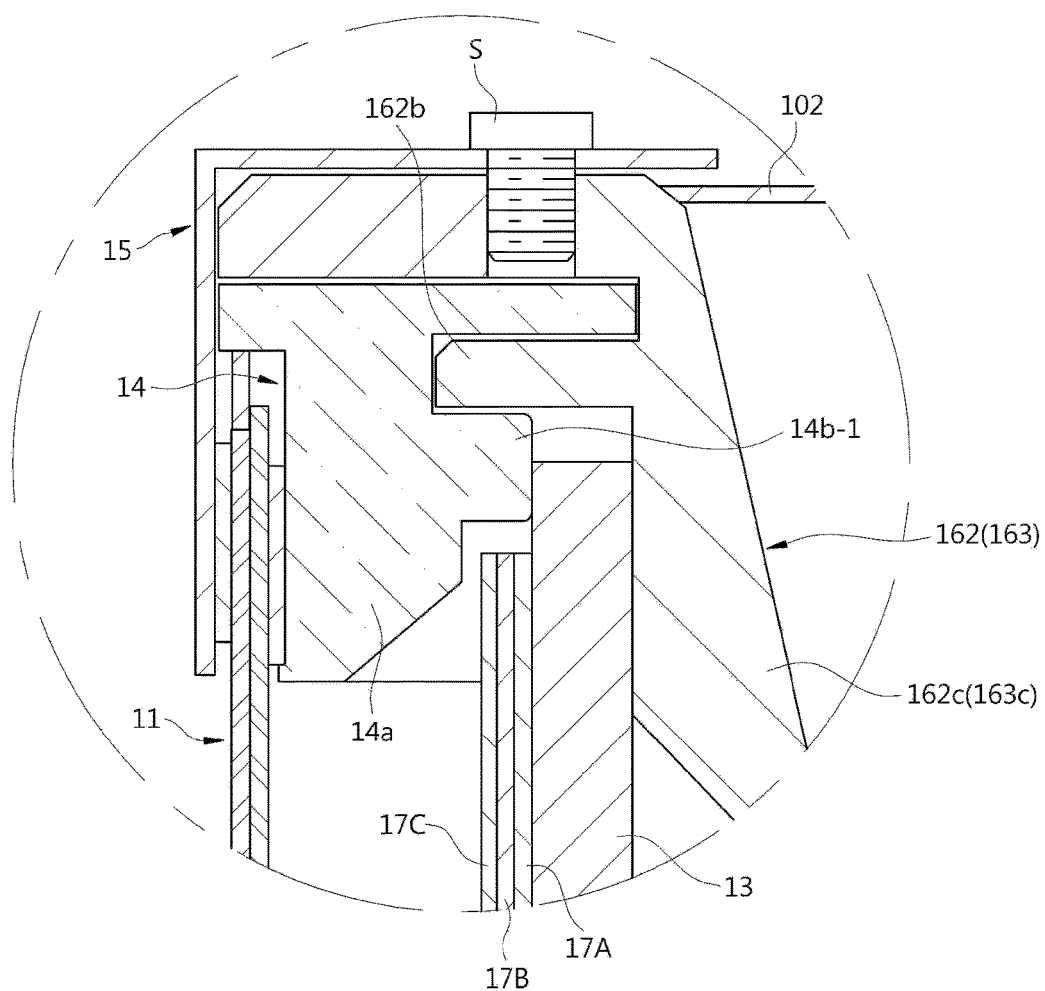
FIG. 6 is a cross-sectional view of a diffusion plate support unit of a display apparatus according to an exemplary embodiment.

Although one or more exemplary embodiments may include a plurality of diffusion plate support units 14b, the scope or spirit of the present invention is not limited thereto. As can be seen from FIG. 6, the diffusion plate support unit 14b may be extended along the outer wall of the diffusion plate 13. Further, the diffusion plate support unit 14b may be provided at portions of the middle mold 14 corresponding to four corners of the diffusion plate 13.

In one or more exemplary embodiments, each of the display panel 11, the diffusion plate 13, and the backlight unit 12 is formed in a rectangular flat panel. The front chassis 15, the middle mold 14, and the rear chassis 16 are formed in a curved shape. When the display panel 11, the diffusion plate 13, and the backlight unit 12 are installed in the curved front chassis 15, the curved middle mold 14, and the curved rear chassis, the display panel 11, the diffusion plate 13, and the backlight unit 12 are formed in a curved shape to respectively correspond to the front chassis 15, the middle mold 14, and the rear chassis 16.

In one or more exemplary embodiments, the display 10 may include a liquid crystal panel as the display panel 11, and include the backlight unit 12 for supplying light to the display panel 11. It is necessary for the rear chassis 16 to have at least a predetermined thickness to accommodate the backlight unit 12.

It is difficult to manufacture the rear chassis 16 having a predetermined thickness or greater to be manufactured in a curved shape in a single process or as a single unit.

Figure 4:
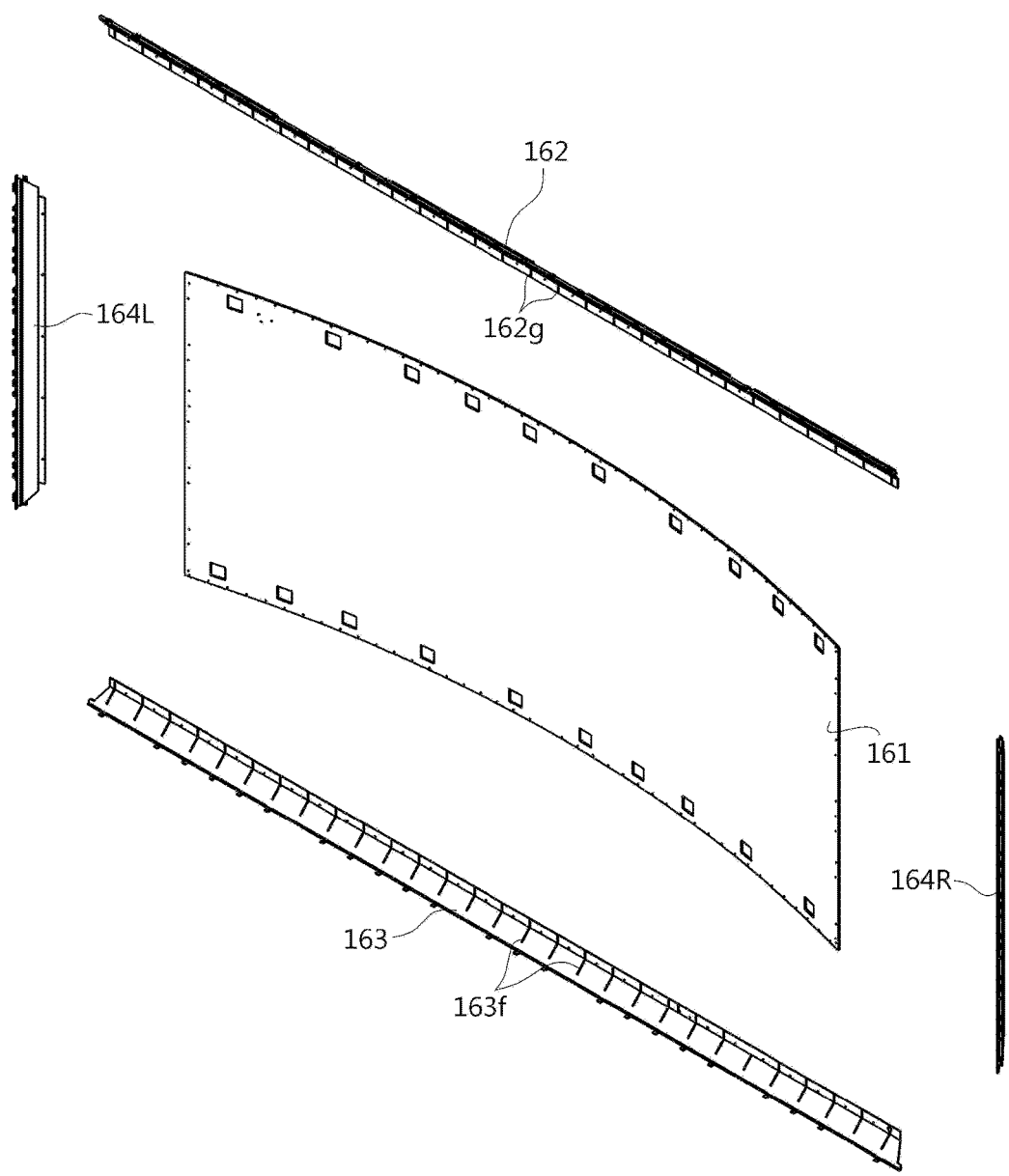
FIG. 4 is an exploded perspective view of a rear chassis of a display apparatus according to an exemplary embodiment.

Accordingly, as can be seen from FIG. 4, the rear chassis 16 includes a back plate 161 forming a back surface of the rear chassis 16; an upper frame 162 forming an upper part of the rear chassis 16; a lower frame 163 forming a lower part of the rear chassis 16; and a pair of lateral frames (164L, 164R) forming both lateral parts of the rear chassis 16. The upper frame 162, the lower frame 163, and two lateral frames (164L, 164R) are coupled to the back plate 161 through a fastening member (S in FIG. 3) such as a screw, to form the rear chassis 16. A plurality of fastening holes (161a, 162a, 163a) may be located at the corresponding positions of the back plate 161, the upper frame 162, and the lower frame 163. The fastening member (S) is coupled to the fastening hole 161a provided at the back plate 161 through the fastening holes (162a, 163a) provided at the upper frame 162 or the lower frame 163, so that the back plate 161 is coupled to the upper frame 162 and the lower frame 163.

The back plate 161 is formed in a rectangular flat panel shape so as to form a back surface of the rear chassis 16, and a plurality of boards 121 of the backlight unit 12 may be arranged on a front surface of the back plate 161. The back plate 161 may be formed having a honeycomb structure disposed between two plates, so that the back plate 161 has a light weight and a sufficiently high strength. In addition, both lateral ends of the back plate 161 protrude forward so that the boards 121 are curved and fixed to the back plate 161.

The upper frame 161 is extended in a horizontal direction of the rear chassis 16, so that it is coupled to the upper end of the back plate 161. The lower frame 163 is extended in a horizontal direction of the rear chassis 16, so that it is coupled to the lower end of the back plate 161. In addition, two lateral frames (164L, 164R) are extended in a vertical direction of the rear chassis 16, so that the two lateral frames (164L, 164R) are respectively coupled to lateral ends of the back plate 161.

The upper frame 162 or the lower frame 163 may include a first coupling unit (162b, 163b), a diffusion plate seating unit (162c, 163c), a tilted unit (162d, 163d), and a second coupling unit (162e, 163e). The first coupling unit (162b, 163b) provided at a front end of the upper frame 162 or lower frame 163 is coupled to the middle mold 14. The diffusion plate 13 is seated and supported by the diffusion plate seating unit (162c, 163c). The tilted unit (162d, 163d) obliquely extends from the diffusion plate seating unit (162c, 163c) to a rear end of the upper frame 162 or the lower frame 163. The second coupling unit (162e, 163e) extends from a rear end of the tilted unit (162d, 163d) to the back plate 161, so that the back plate 161 is coupled to a front surface of the second coupling unit (162e, 163e).

In addition, the upper frame 162 and the lower frame 163 may respectively include board support units (162*f*, 163*f*), i.e., board support portions, that are vertically extended from the tilted units (162*d*, 163*d*) for supporting the source PCBs 101. In one or more exemplary embodiments, the source PCBs 101 may be installed on a back surface of the board support units (162*f*, 163*f*).

Figure 10:
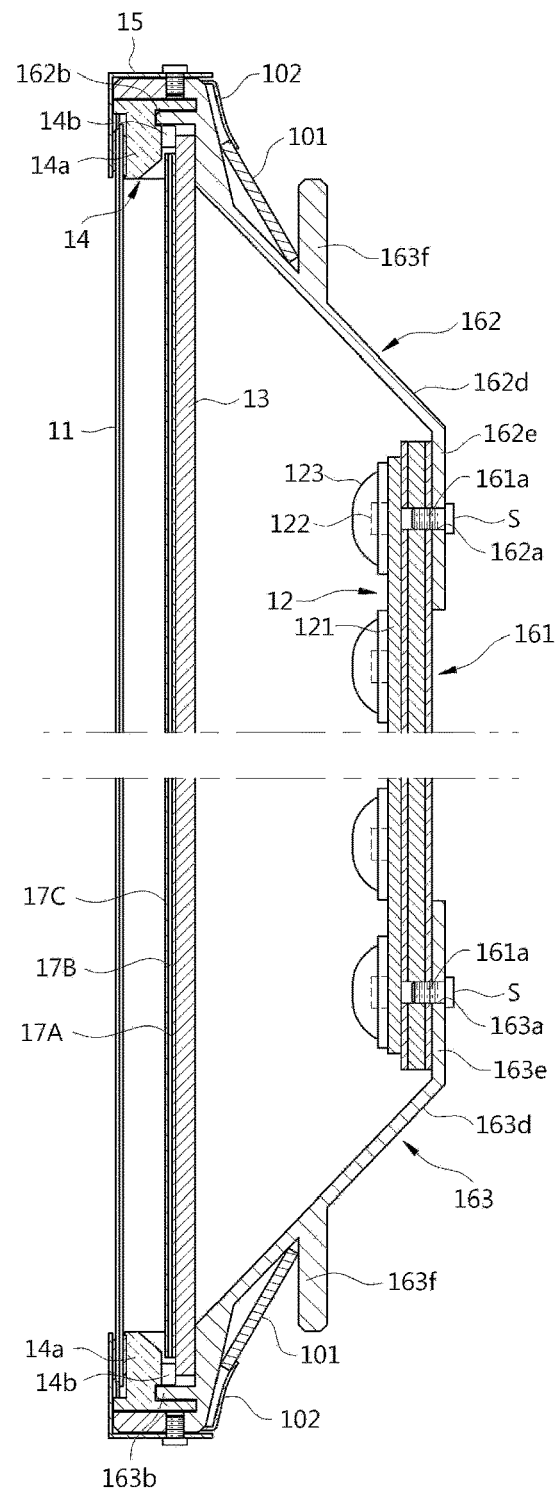
FIG. 10 is a cross-sectional view of a display of a display apparatus according to an exemplary embodiment.

Although the source PCBs 101 are illustrated in FIG. 3 installed one the back surfaces of the board support units (162*f*, 163*f*), the scope or spirit of the present invention is not limited thereto. For example, as shown in FIG. 10, the source PCBs 101 may be supported and installed on the front surface of the board support units (162*f*, 163*f*), and the length of the flexible PCBs 102 can be minimized.

In one or more exemplary embodiments, the upper frame 162, the lower frame 163, and two lateral frames (164L, 164R) are formed of aluminum (Al) and manufactured through extrusion molding. In addition, each of the upper frame 162 and the lower frame 163 may include a plurality of slits (162*g*, 163*g*) so that the upper frame 162 and the lower frame 163 can be easily modified in shape. The plurality of slits (162*g*, 163*g*) may extend vertically through the upper frame 162 and the lower frame 163, and may be horizontally spaced at predetermined distances.

Therefore, when the upper frame 162 and the lower frame 163 are coupled to the curved back plate 161, the spacing between rear ends of the slits (162*g*, 163*g*) may be greater than spacing between front ends of the slits (162*g*, 163*g*), and the shapes of the upper frame 162 and the lower frame 163 are modified.

In one or more exemplary embodiments, the back plate 161 is curved in such a manner that both lateral sides thereof protrude forward, and the upper frame 162 and the lower frame 163 are extended in a horizontal width direction of the rear chassis 16.

As described above, the upper frame 162 and the lower frame 163 include a plurality of slits (162*g*, 163*g*) the back plate 161 has a sufficient strength through a honeycomb structure, and so that the shapes of the upper frame 162 and the lower frame 163 may be easily modified. In this case, the back plate 161 has a higher strength than the upper frame 162 and the lower frame 163.

Therefore, when the upper frame 162 and the lower frame 163 are affixed to the back plate 161 through the fastening member S, the shapes of the upper frame 162 and the lower frame 163 are modified to a curved shape corresponding to the shape of the back plate 161. That is, the upper frame 162 and the lower frame 163 are curved so that both lateral ends thereof protrude forward in the same manner as the back plate 161. When the two lateral frames (164L, 164R) are also affixed to lateral sides of the back plate 161, the rear chassis 16 is completely manufactured. The order of affixing the upper frame 162, the lower frame 163, and the two lateral frames (164L, 164R) to the back plate 161 may be changes.

As described above, after the rear chassis 16 is divided into the back plate 161, the upper frame 162, the lower frame 163, and two lateral frames (164L, 164R), and the upper frame 162 and the lower frame 163 are curved when coupled to the curved back plate 161, and the curved rear chassis 16 can be easily manufactured.

In one or more exemplary embodiments, the upper frame 162, the lower frame 163, and two lateral frames (164L, 164R) are formed of aluminum (Al) through extrusion molding, and include the slits (162*g*, 163*g*) such that the shapes of the upper frame 162, the lower frame 163, and two lateral frames (164L, 164R) can be easily modified. The scope or spirit of the present invention is not limited thereto. As a non-limiting example, the upper frame 162, the lower frame 163, and the two lateral frames (164L, 164R) may be formed of resin through injection molding, so that the shapes thereof can be easily modified without using a slit structure. Further, the upper frame 162, the lower frame 163, and the two lateral frames (164L, 164R), may be formed as a continuous frame.

Figure 7:
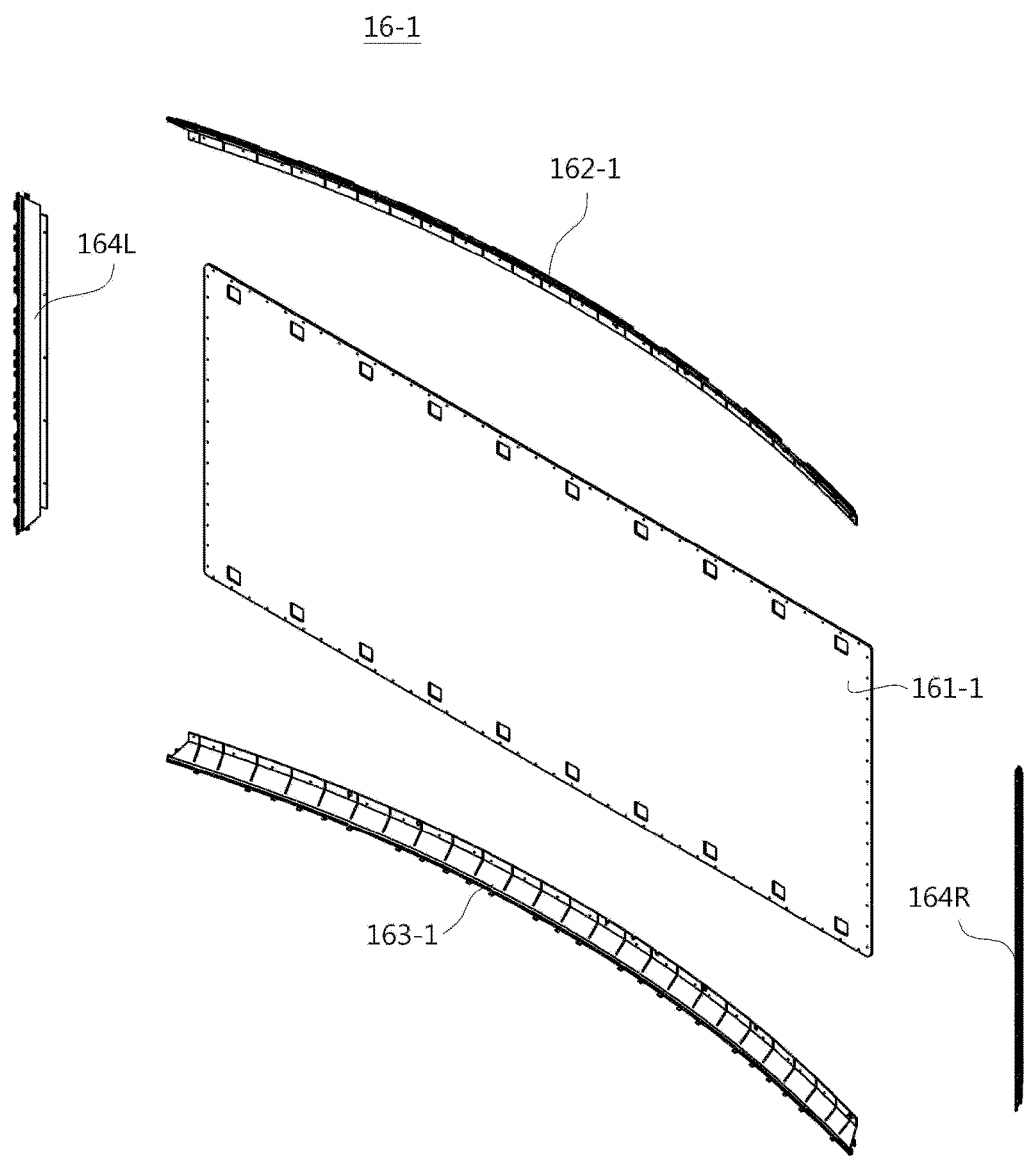
FIG. 7 is an exploded perspective view of a rear chassis of a display apparatus according to an exemplary embodiment.

In one or more exemplary embodiments, although the back plate 161 is curved and the upper frame 162 and the lower frame 163 are linearly formed, the scope or spirit of the present invention is not limited thereto. For example, as shown in FIG. 7, the back plate 161 may be formed in a flat panel, and both lateral sides of the upper frame 162-1 and the lower frame 163-1 protrude forward so that the upper frame 162-1 and the lower frame 163-1 are curved. The upper frame 162-1 and the lower frame 163-1 are fixed to the back plate 161-1 so that the shape of the back plate 161-1 may be changed to a curved shape corresponding to the curved shapes of the upper frame 162-1 and the lower frame 163-1. In this case, the upper frame 162-1 and the lower frame 163-1 may have a higher strength than the back plate 161-1.

Figure 8:
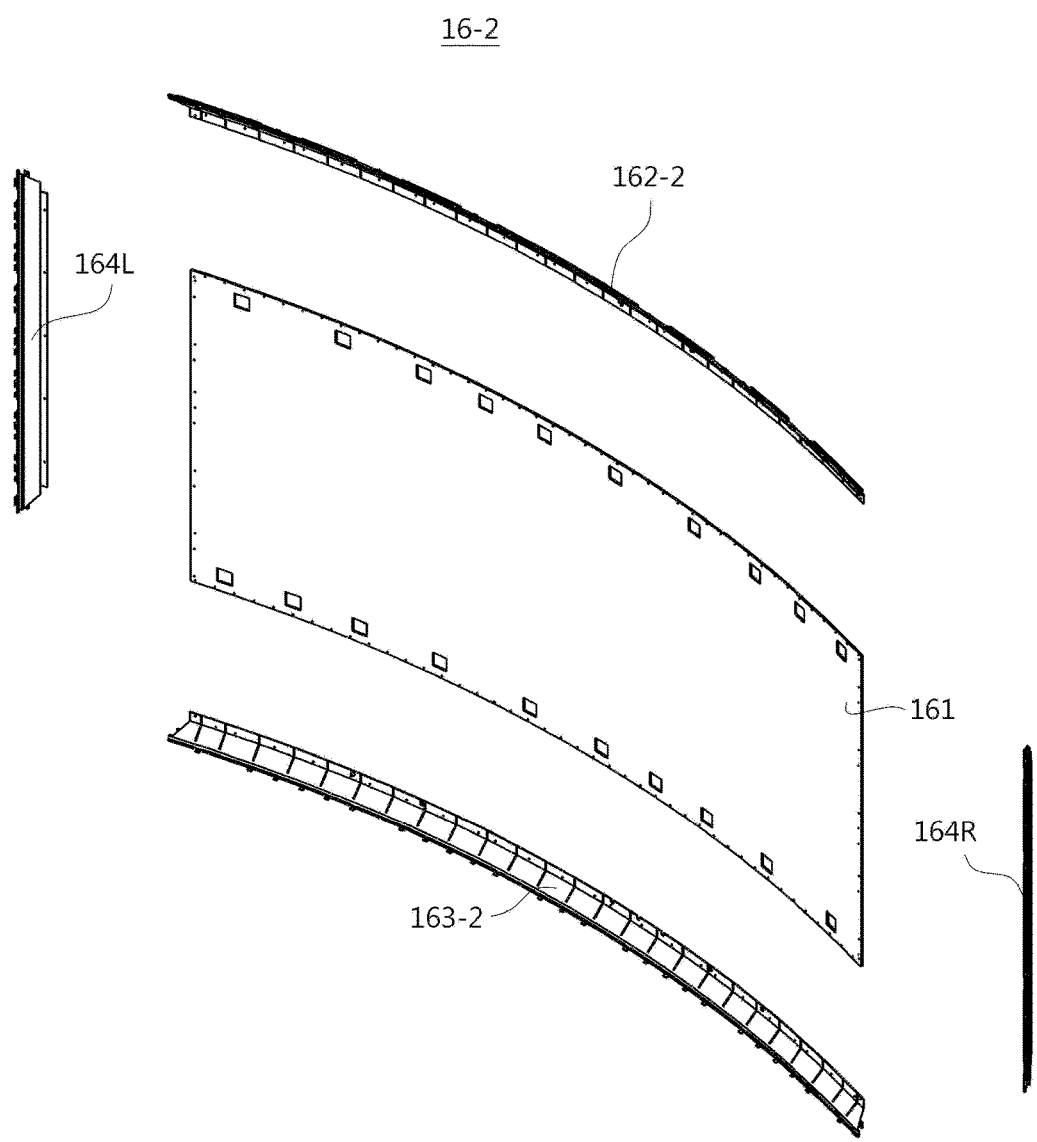
FIG. 8 is an exploded perspective view of a rear chassis of a display apparatus according to an exemplary embodiment.

In the display 10 shown in FIG. 8, the back plate 161, the upper frame 162, and the lower frame 163 may all be manufactured in a curved shape, and the upper frame 162 and the lower frame 163 may be fixed to the back plate 161.

Figure 9:
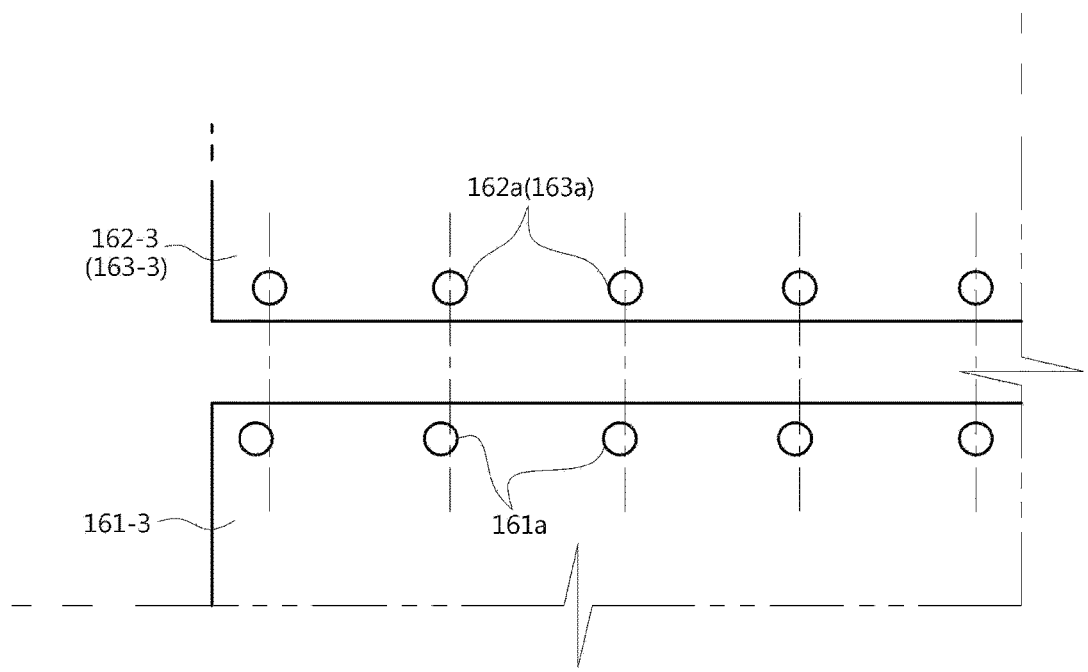
FIG. 9 is a conceptual diagram illustrating a method for coupling a back plate of a rear chassis to an upper frame and a lower frame of a display apparatus according to an exemplary embodiment.

FIG. 9 illustrates the spacing between the fastening holes (162*a*, 163*a*) provided in the upper frame 162 or the lower frame 163 is set to a predetermined distance, and the spacing between the fastening holes 161*a* provided in the back plate 161 corresponds to the spacing between the fastening holes (162*a*, 163*a*) provided in the upper frame 162 and the lower frame 163.

Although one or more exemplary embodiments have been described as a direct-type display apparatus that includes a board 121 arranged at a back plate 161 and a backlight unit 12 including an LED 122 populated on the board 121, the scope or spirit of the present invention is not limited thereto. As a non-limiting example, one or more exemplary embodiments may also be applied to an edge-type display apparatus that includes a guide plate arranged at a rear end of the display panel, boards arranged at one or more sides of the guide plate, and LEDs arranged on the boards.

In addition, although the backlight unit 12 has been described including the board 121 and the LED 122 as a light source, the scope or spirit of the present invention is not limited thereto. Various kinds of light sources may be used the backlight unit.

As is apparent from the above description, the display apparatus according to one or more exemplary embodiments includes a rear chassis. The rear chassis includes a back plate, an upper frame coupled to an upper end of the back plate, and a lower frame coupled to a lower end of the back plate. The upper frame and the lower frame are coupled to the back plate, so that the curved rear chassis can be more easily manufactured.

In addition, the display apparatus according to one or more exemplary embodiments a diffusion plate support unit contained in a middle mold to directly support a front surface of the diffusion plate, so that the display apparatus can prevent the occurrence of wrinkles in an optical sheet when the diffusion plate support unit supports the diffusion plate through the optical sheet.

Although a few exemplary embodiments have been shown and described, it would be appreciated by those skilled in the art that changes may be made without departing from the principles and spirit of the invention, the scope of which is defined in the claims and their equivalents.

What is claimed is:

1. A display apparatus comprising:
a display panel configured to display an image; and
a rear chassis arranged at a rear side of the display panel, the rear chassis comprising a back plate forming a back surface of the rear chassis, an upper frame coupled to an upper end of the back plate, and a lower frame coupled to a lower end of the back plate,
wherein the back plate is curved so that lateral sides thereof protrude forward, and
wherein the upper frame and the lower frame are deformed to have a curved shape when the upper frame and the lower frame are directly fastened to the curved back plate so as to form the rear chassis.

2. The display apparatus according to claim 1, wherein:
the upper frame and the lower frame are curved so that lateral sides thereof protrude forward, and
when the back plate is coupled to the upper frame and the lower frame, the back plate is curved to correspond to the curve of the upper frame and the lower frame.

3. The display apparatus according to claim 1, wherein:
the back plate is curved so that lateral sides thereof protrude forward, and
when the upper frame and the lower frame are coupled to the back plate, the upper frame and the lower frame are curved to correspond to the curve of the back plate.

4. The display apparatus according to claim 1, wherein:
the back plate, the upper frame, and the lower frame are fastened together through fastening members;
each of the back plate, the upper frame, and the lower frame comprise fastening holes through which the fastening members pass;
the fastening holes provided in the upper frame and the lower frame are spaced apart from each other at predetermined distances; and
the fastening holes provided in the back plate are spaced apart corresponding to the spacing between the fastening holes provided in the upper frame and the lower frame.

5. The display apparatus according to claim 1, wherein:
the back plate is curved so that lateral sides thereof protrude forward, and
the upper frame and the lower frame are curved corresponding to the curvature of the back plate.

6. The display apparatus according to claim 1, wherein the rear chassis further comprises two lateral frames coupled to respective lateral ends of the back plate.

7. The display apparatus according to claim 6, wherein the two lateral frames, the upper frame, and the lower frame are formed as a continuous frame.

8. The display apparatus according to claim 1, further comprising:
a backlight unit arranged in the rear chassis configured to provide light to the display panel, the backlight unit comprising a board arranged in front of the back plate and a plurality of light emitting diodes (LEDs) arranged on the board.

9. The display apparatus according to claim 1, further comprising:
a diffusion plate arranged behind a rear side of the display panel;
at least one optical sheet arranged on a front surface of the diffusion plate between the display panel and the diffusion plate; and
a middle mold configured to support the display panel and an outer wall of the diffusion plate in such a manner that the display panel and the outer wall of the diffusion plate are spaced apart from each other by a predetermined distance,
wherein the middle mold comprises at least one diffusion plate support unit that is in direct contact with the front surface of the diffusion plate so as to directly support the diffusion plate.

10. The display apparatus according to claim 9, wherein the at least one diffusion plate support unit comprises a plurality of diffusion plate support units spaced apart from each other along the outer wall of the diffusion plate.

11. The display apparatus according to claim 9, wherein the at least one diffusion plate support unit is extended along an entirety of the outer wall of the diffusion plate.

12. The display apparatus according to claim 9, further comprising:
a front chassis coupled to a front side of the middle mold to maintain a connection state between the display panel and the middle mold; and
a source printed circuit board (PCB) coupled to the display panel through a flexible PCB,
wherein at least one of the upper frame and the lower frame comprises a board support unit extending in a vertical direction configured to support the source PCB, and
wherein the rear chassis is coupled to a rear side of the middle mold.

13. The display apparatus according to claim 1, where the upper frame and the lower frame are linear prior to being fastened to the curved back plate and wherein each of the upper frame and the lower frame extend from one end of the back plate to another end of the back plate.

14. The display apparatus according to claim 1, wherein the upper frame and the lower frame are formed of resin through injection molding and are continuously bendable from one end of the back plate to another end of the back plate.

15. A chassis comprising:
a back plate forming a back surface of the chassis;
an upper frame coupled to an upper end of the back plate; and
a lower frame coupled to a lower end of the back plate,
wherein the chassis is curved so that lateral ends of the back plate, the lower frame, and the upper frame protrude forward, and
wherein the upper frame and the lower frame are directly fastened to the back plate, and
wherein the back plate is curved so that lateral sides thereof protrude forward,
wherein the upper frame and the lower frame are deformed to have a curved shape when the upper frame and the lower frame are directly fastened to the back plate so as to form the chassis, and
wherein the chassis is at a rear side of a display panel.

16. The chassis according to claim 15, wherein the upper frame and the lower frame are curved so that lateral sides thereof protrude forward, and
wherein, when the back plate is coupled to the upper frame and the lower frame, the back plate is curved corresponding to the curvature of the upper frame and the lower frame.

17. The chassis according to claim 15, wherein:
the back plate is curved so that lateral sides thereof protrude forward, and wherein, when the upper frame and the lower frame are coupled to the back plate, the upper frame and the lower frame are curved corresponding to the curvature of the back plate.

18. The chassis according to claim 17, wherein the upper frame comprises a plurality of slits configured to provide flexibility to the upper frame, and wherein the lower frame comprises a plurality of slits configured to provide flexibility to the lower frame.

19. The chassis according to claim 17, wherein the back plate comprises a honeycomb structure disposed between two plates.

20. The chassis according to claim 15, wherein:
the back plate is curved so that lateral sides thereof protrude forward, and
the upper frame and the lower frame are curved corresponding to the curvature of the back plate.

21. The chassis according to claim 15, further comprising two lateral frames coupled to respective lateral ends of the back plate.

22. A method of manufacturing a chassis comprising:
affixing a lower frame to a lower end of a back plate forming a back surface of the chassis; and
affixing an upper frame to an upper end of the back plate, wherein the chassis is curved so that lateral ends of the back plate, the lower frame, and the upper frame protrude forward,
wherein the lower frame and the upper frame are directly fastened to the back plate and the chassis is at a rear side of a display panel,
wherein the back plate is curved so that lateral sides thereof protrude forward, and
wherein the upper frame and the lower frame are deformed to have a curved shape when the upper frame and the lower frame are directly fastened to the back plate.

23. The method according to claim 22, wherein the back plate has a curved shape, and
wherein the affixing the lower frame and the affixing the upper frame curves at least one of the lower frame and the upper frame corresponding to the curvature of the back plate.

24. The method according to claim 22, wherein the lower frame and the upper frame has a curved shape, and
wherein the affixing the lower frame and the affixing the upper frame curves the back plate corresponding to the curvature of the lower frame and the upper frame.

* * * * *